US008856544B2

(12) United States Patent
Bosch et al.

(10) Patent No.: US 8,856,544 B2
(45) Date of Patent: Oct. 7, 2014

(54) SYSTEM AND METHOD FOR PROVIDING SECURE VIRTUAL MACHINES

(75) Inventors: Peter Bosch, Aalsmeer (NL); Vladimir Kolesnikov, Jersey City, NJ (US); Sape Mullender, Amsterdam (NL); Jim McKie, Murray Hill, NJ (US); Philippe Dobbelaere, Broechem (BE); Hubert McLellan, Summit, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 47 days.

(21) Appl. No.: 13/379,398

(22) PCT Filed: Jul. 16, 2010

(86) PCT No.: PCT/EP2010/060341
§ 371 (c)(1),
(2), (4) Date: Feb. 1, 2012

(87) PCT Pub. No.: WO2011/006997
PCT Pub. Date: Jan. 20, 2011

(65) Prior Publication Data
US 2012/0137117 A1    May 31, 2012

(30) Foreign Application Priority Data

Jul. 16, 2009  (EP) .................................... 09165682

(51) Int. Cl.
*G06F 11/00* (2006.01)
*G06F 21/57* (2013.01)
*G06F 21/53* (2013.01)
(52) U.S. Cl.
CPC .............. *G06F 21/53* (2013.01); *G06F 21/572* (2013.01)
USPC ........... 713/187; 713/155; 713/176; 713/180; 713/189; 713/193; 726/22; 726/1; 726/14; 711/64; 709/223

(58) Field of Classification Search
USPC ................. 713/187, 155, 176, 180, 189, 193; 726/22, 1, 4; 711/164; 709/223
See application file for complete search history.

(56) References Cited

U.S. PATENT DOCUMENTS

| 7,228,434 | B2 * | 6/2007 | Zisowski ...................... 713/187 |
| 2005/0246552 | A1 * | 11/2005 | Bade et al. ..................... 713/193 |

(Continued)

FOREIGN PATENT DOCUMENTS

| WO | 9938070 | 7/1999 |
| WO | 2008119961 | 10/2008 |

OTHER PUBLICATIONS

Garfinkel, T.; Terra: A Virtual Machine-based platform for trusted computing; ACM SOSP; Proceedings of the ACM Symposium on Operating Systems Principles; Oct. 19, 2003; pp. 193-206; XP002340992.

*Primary Examiner* — Beemnet Dada
*Assistant Examiner* — Sayed Beheshti Shirazi
(74) *Attorney, Agent, or Firm* — Carmen Patti Law Group, LLC

(57) ABSTRACT

The present invention provides improved security in a virtual machine. By extending the capabilities of modern secure processors, privacy of computation is provided from both the owner of the equipment and other users executing on the processor, which is an advantageous feature for rentable, secure computers. In addition to the hardware extensions required to secure a virtualizable computer, an infrastructure for the deployment of such processors is also provided. Furthermore, a signaling flow to establish the various relationships between the owner, user and manufacturer of the equipment is disclosed.

18 Claims, 3 Drawing Sheets

(56) References Cited

U.S. PATENT DOCUMENTS

| | | |
|---|---|---|
| 2005/0289351 A1* | 12/2005 | England et al. ............... 713/180 |
| 2006/0029400 A1* | 2/2006 | Nasu .............................. 399/12 |
| 2006/0212939 A1* | 9/2006 | England et al. ................. 726/22 |
| 2009/0037682 A1* | 2/2009 | Armstrong et al. ........... 711/164 |
| 2009/0094673 A1* | 4/2009 | Seguin et al. ..................... 726/1 |
| 2009/0249472 A1* | 10/2009 | Litvin et al. .................... 726/14 |
| 2009/0276774 A1* | 11/2009 | Kinoshita ........................ 718/1 |
| 2009/0307499 A1* | 12/2009 | Senda ........................... 713/187 |
| 2009/0327700 A1* | 12/2009 | Blade et al. .................. 713/155 |
| 2010/0100744 A1* | 4/2010 | Dutta ............................ 713/176 |
| 2012/0005467 A1* | 1/2012 | Butler et al. ...................... 713/2 |
| 2012/0117212 A1* | 5/2012 | Fries ............................. 709/223 |

\* cited by examiner

|  | SAMB value | Peripheral 1 | Peripheral 2 | Peripheral 3 | Peripheral 4 |
|---|---|---|---|---|---|
| Unsecured Machine | $00_b$ | 0 | 0 | 0 | 0 |
| SVM #1 | $01_b$ | 1 | 0 | 1 | 0 |
| SVM #2 | $10_b$ | 0 | 1 | 0 | 1 |
| Super Secure Virtual Machine | $11_b$ | 1 | 1 | 1 | 1 |

SYSTEM AND METHOD FOR PROVIDING SECURE VIRTUAL MACHINES

FIELD OF THE INVENTION

The present invention is related to the field of cloud computing or network-based computing, more specifically to the field of secure virtual machines.

BACKGROUND

Virtual computing is an important component of cloud computing. One can rent a virtual computer that is located somewhere in the Internet to run one's applications. While this is an appropriate method for accessing cheap cycles, it also has an inherent threat: since the application runs on somebody else's computer, no guarantees can be given on the privacy of one's data and application. Today's general purpose processors do not provide a mechanism to protect against owners of the cloud or network-based computer (i.e., infrastructure providers) snooping the networked computer.

SUMMARY

The absence of secure virtual computing is a serious obstacle to the development of cloud computing. The benefits of hosting applications in the network must be weighed against the threat of applications and/or application data becoming public due to the inherently unsecure nature of existing processors.

For instance, running a web server database with private account information on a cloud/network-based computer implies that an adversary with physical access to the cloud/network-based computer can access memory banks and access internal processor registers, for instance by using a Joint Test Action Group (JTAG) connection. Alternatively, an attacker can try to break into the operations of the physical machine by modifying the host operating system or virtual machine manager, hereinafter also referred to as "zone manager".

Moreover, software break-ins in the zone manager may enable access to other applications and application data of other users in the machine's memory space. A particular type of attacks uses root kits, which consist of software deployed below the operating system, and undetectable to the latter without specially targeted tools.

A number of components are required in the security architecture to allow secure rental of virtual computers to users. The processor needs to provide a secure processing environment, it needs to establish a secure boot procedure with a verifiable software stack, it needs to provide secure endpoints through the owner of the computer (i.e., the infrastructure provider) for establishing secure virtual zones within the processor, and it needs to be able to securely load the application from the user. Meanwhile, the owner must not be able to learn any meaningful private data from the application that executes on their computer.

A general embodiment of a secure processor according to the present invention comprises a memory storing a processor private key, a first generator for generating a first public/private key pair to be associated with an instance of a zone manager, a first certification agent for certifying the first public/private key pair by means of the processor private key, a receiver for securely receiving a virtual machine instantiation command, a second generator for generating a second public/private key pair to be associated with an instance of a virtual machine, created in response to the instantiation command, and a second certification agent for certifying the second public/private key pair by means of the first public/private key pair.

In one embodiment, the processor of the present invention further comprises a private boot area (410) for storing an initial boot program.

In one embodiment, the processor of the present invention further comprises means for receiving and validating an image file comprising the zone manager.

In one embodiment of the processor of the present invention, a security aspect of said securely receiving a virtual machine instantiation command relies on a certificate obtained through a PKI.

In one embodiment, the processor of the present invention further comprises a memory for use by said plurality of secure virtual machines, wherein access to the memory is secured by a different cryptographic key for different ones of the plurality of secure virtual machines.

In one embodiment, the processor of the present invention further comprises a memory storing digital access permission information for the plurality of secure virtual machines.

A general embodiment of a method for setting up secure virtual machines according to the present invention, comprises booting the processor with a zone manager image; procuring at the processor a first public/private key pair associated with the zone manager session; certifying the public key of the first public/private key pair at the processor with a private key associated with the processor; receiving at the zone manager a secure virtual machine instantiation command; creating between the zone manager and the user a secure communication channel; procuring a second public/private key pair associated with the secure virtual machine; and certifying the public key of the second public/private key pair with the private key of the first public/private key pair.

In one embodiment, the method of the present invention further comprises booting a processor from a program stored in a private boot area.

In one embodiment, the method of the present invention further comprises downloading said zone manager image to said processor, and verifying at said processor a validation value pertaining to said zone manager image, as a precondition for said booting of said zone manager image.

In one embodiment of the method of the present invention, a security aspect of said secure communication channels relies on a certificate obtained through a PKI.

In one embodiment, the method of the present invention further comprises associating with said secure virtual machine a cryptographic key for accessing particular content stored in a shared memory of the processor.

In one embodiment of the method of the present invention, the secure virtual machine instantiation command comprises a certificate pertaining to said user. In a particular embodiment, a security aspect of said secure communication channel relies on said certificate pertaining to said user.

In another particular embodiment, the method further comprises providing said certificate pertaining to said user to said zone manager.

In one embodiment of the method of the present invention, the secure communication channel is secured by means of public key cryptography.

In one embodiment, the method of the present invention further comprises updating a capability matrix with access permissions for said virtual machine.

In one embodiment, the method of the present invention further comprises preparing the secure virtual machine by providing it with a boot program and starting the secure virtual machine.

An embodiment of the present invention is based on the insight that a secure virtual machine environment can be obtained by judiciously establishing and combining the appropriate trust relationships between a service provider, a service user, a zone manager, and a virtual machine instantiation. An embodiment of the present invention is further based on the insight that a service user, a service provider, and a hardware manufacturer each have a role in establishing these trust relationships. Hereinafter, the service user may be referred to as "user", the service provider may be referred to as "owner", and the hardware manufacturer may be referred to as "manufacturer".

A person skilled in the art of digital authentication and secure communication will readily appreciate that the trust relationships described herein may inter alia be established by means of public key cryptography (PKC), whereby cryptographically secured data tunnels are created and the public keys of the various actors are certified by appropriate certification authorities. The establishment of trust relationships is further described in terms of public key cryptography, without intent to limit the invention to any PKC-specific implementation details.

In a particular embodiment, a first trust relationship is established between a service provider and a zone manager instantiated on a hardware platform. The hardware platform holds a private key, the public counterpart of which is certified by the hardware manufacturer. The zone manager holds a private key, the public counterpart of which is in turn certified by the hardware platform. A second trust relationship is established between a user and the service provider; their credentials are established by any trusted means, and certified by any trusted authority, in the usual way. A third trust relationship is established between the user and the zone manager. A fourth trust relationship is established between the user and a virtual machine instantiated by the zone manager in response to a request received from the service provider. The virtual machine instance holds a private key, the public counterpart of which is certified by the zone manager. The authenticity of the hardware platform, the zone manager, and the virtual machine instantiation can all be brought back to an assertion from the hardware manufacturer, which is assumed to be trusted, through the respective certificate chains.

An embodiment of the present invention is based on the insight that the concept of hardware protection rings can advantageously be extended to hardware hosting multiple virtual machine instantiations, by providing a two-dimensional matrix representing the capabilities of each virtual machine on the peripherals inside the secure hardware platform. Thus, virtualization may be obtained without introducing any conversion of binary executables. This is an important advantage in view of the need to verify checksums over executable code inside the runtime environment.

BRIEF DESCRIPTION OF THE FIGURES

Some embodiments of apparatus and/or methods in accordance with embodiments of the present invention are now described, by way of example only, and with reference to the accompanying drawings, in which.

DESCRIPTION OF EMBODIMENTS

High-performance secure computing may be achieved by combining time slicing of the processor between an unsecured and a secured computing ring or zone, with extensions to the ASIC internal bus to reflect the processor's current ring or zone to the internal ASIC peripherals.

Although the term "ASIC" is used herein to refer to the secure processor, which may in certain embodiments be implemented by means of ASIC technology, no limitation to said technology is implied.

When the processor is in its secure ring or zone, security peripherals are active. If the processor is in its unsecured ring or zone, security peripherals do not respond. When switching between zones, the processor verifies the parameters passed between the zones. Such a combination is available in ARM's 1176 processor with Trustzone. The present invention may inter alia be embodied as an ASIC with elements similar to those of the ARM 1176/Trustzone architecture, but with additional features adapted to provide virtualization.

According to an embodiment of the invention, a virtual Trusted Computing Base (vTCB) is provided, embedded in a processor, along with an infrastructure that enables the renting of the vTCB in a manner that prevents the owner and manufacturer to snoop, hijack, or alter the computations on the vTCB. It advantageously provides protection rings, capability-based lattices for ACLs, secure high-performance computing, and virtualization techniques.

Three roles are assumed to be of relevance to the operation of the system: owner 220, user 210, and manufacturer 230. The owner owns the vTCB and provides the virtual computing service, the user provides the application that needs to execute securely on a vTCB, and the manufacturer produces the secure ASIC embedding the vTCBs.

Figure 1:
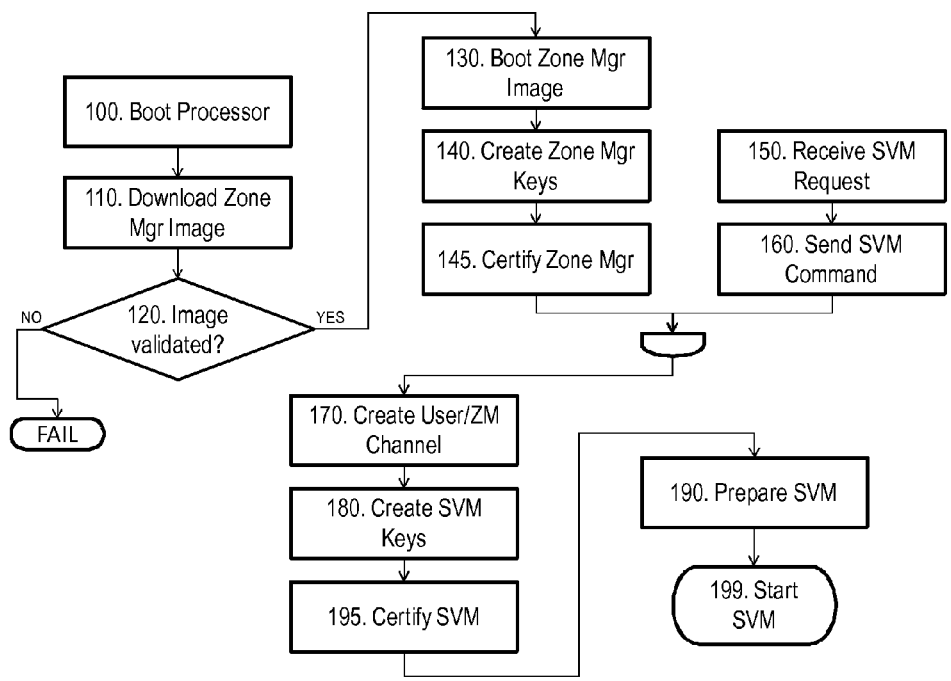
FIG. 1 presents a schematic overview of a method according to the present invention.
Figure 2:
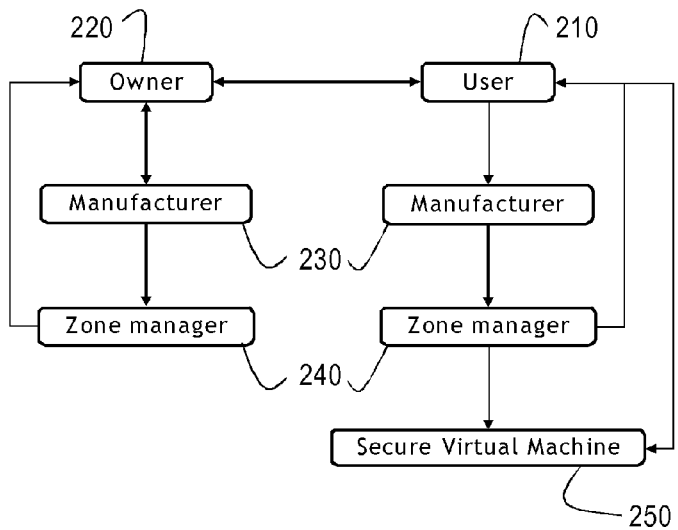
FIG. 2 shows the various trust relations between the respective actors relevant to the method according to the present invention.

FIG. 2 shows the various trust relations between the three roles thus defined.

Further, we recognize two additional entities: a secure zone manager 240 and a secure virtual machine 250. Both secure zone manager 240 and secure virtual machine 250 are part of the vTCB. Here the secure zone manager 240 is the trusted software component running inside the secure ASIC that takes care of the maintenance of the secure virtual machines and is installed by the manufacturer 230. A secure virtual machine 250 is essentially a "slice" of the processor.

A number of trust requirements related to the above entities will now be described in more details. Embodiments of the present invention may address some or all of the described trust requirements.

A first trust requirement is that the user 210 needs to trust the manufacturer 230 to deliver a processor with the appropriate security properties for the establishment of a secure virtual machine 250 that cannot be snooped. The user 210 can only verify that an assertion to this effect indeed originated from the manufacturer 230 by checking the signature on the processor's certificate. The user's trust in the security features of the vTCB (secure zone manager and secure virtual machine) is derived from this trust in the manufacturer.

A second trust requirement is that the owner 220 needs to trust the manufacturer 230 to deliver a vTCB adapted to generate correct usage reports. The owner 220 can only verify that an assertion to this effect indeed originated from the manufacturer 230 by checking the signature on the processor's certificate. The owner's trust in the security features of the vTCB (secure zone manager and secure virtual machine) is based on the use of the zone manager's private key, the authenticity of which is in turn guaranteed by a chain of certificates leading back to the manufacturer. Hence, the owner's trust in the vTCB is derived from this trust in the manufacturer.

A third trust requirement is that the secure zone manager 240 needs to trust it communicates with the appropriate owner 220: it should only operate on request of the actual owner of the device.

A fourth trust requirement is that the user 210 needs to trust it communicates with the owner 220 and vice versa. This trust relation is needed by the owner 220 for accounting, billing and tracking purposes, while for the user 210 it is important to know it communicates with a legitimate owner. This trust requirement is typically addressed by certification through a PKI.

A fifth trust requirement is that the secure zone manager 240 needs to trust it communicates with the appropriate user 210 as instructed by the owner 220. This requirement may be addressed by providing the user's certificate to the secure zone manager as an argument of the virtual machine instantiation command.

A sixth trust requirement is that the secure virtual machine 250 needs to trust it is created by a trustworthy secure zone manager 240 for its own secure boot procedure. This is an implied trust on the manufacturer 230 of the device to have loaded the appropriate boot software and key material in a newly created secure zone.

A seventh trust requirement is that the user 210 and its secure virtual machine 250 need to mutually trust each other: the secure virtual machine 250 needs to understand it communicates with the appropriate user 210 and the user 210 needs to assert it communicates with a true secure virtual machine 250. This requirement is analogous to and derived from the first trust requirement, for the user's part, and the fifth trust requirement, for the secure virtual machine's part.

Figure 3A:
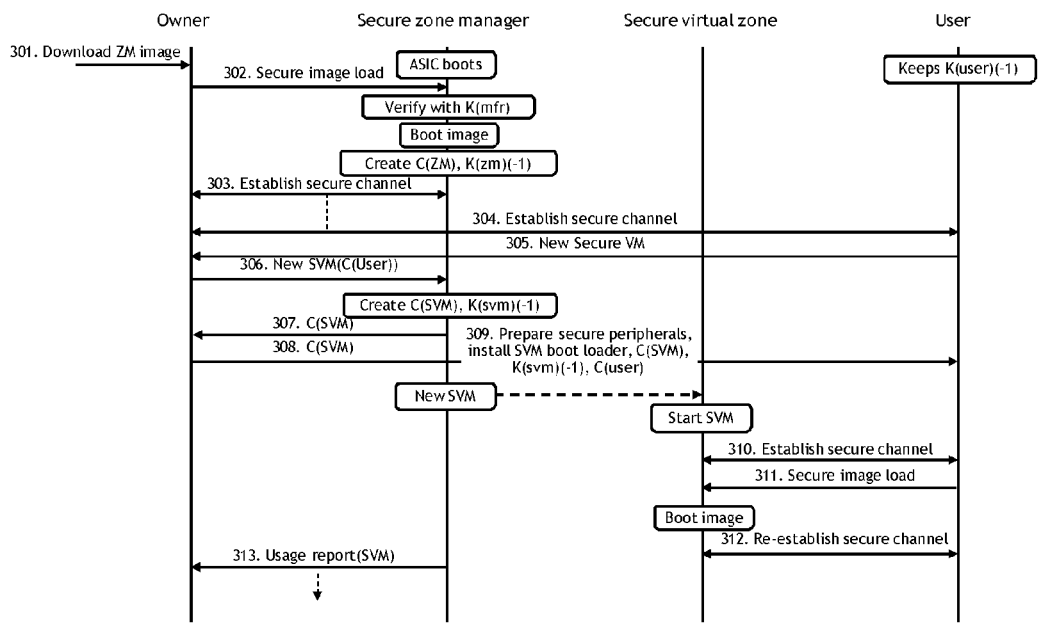
FIG. 3 shows the typical message flows in an embodiment of the method according to the present invention.
Figure 3B:
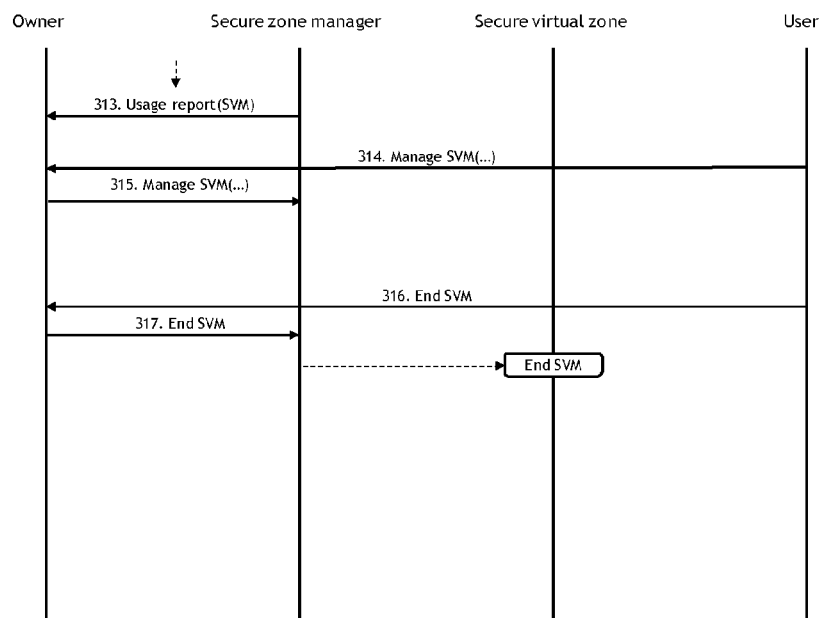
Figures 4, 5:
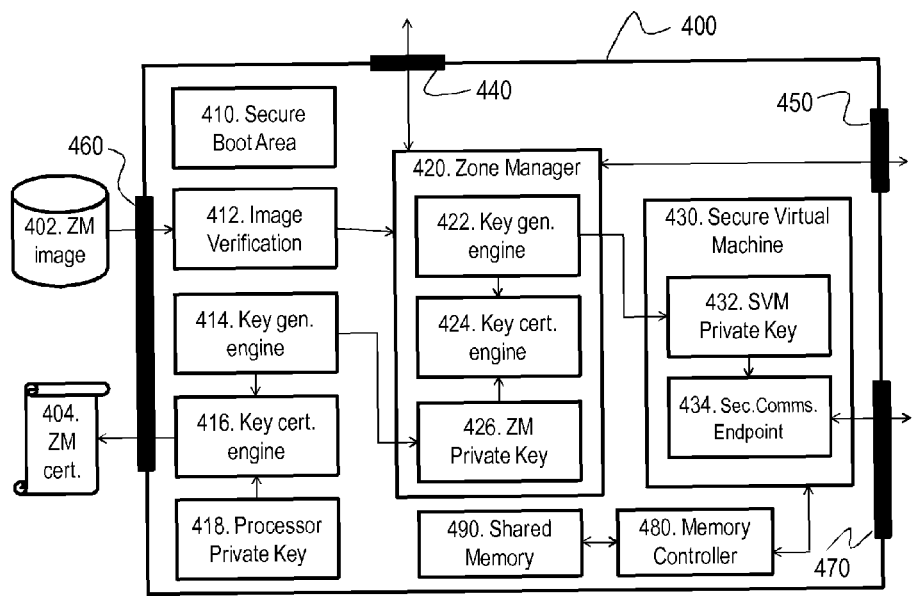
FIG. 4 schematically illustrates an embodiment of a secure processor according to the present invention.
FIG. 5 presents an example of an exemplary capability matrix for virtual machines.

FIG. 3, for convenience split into FIG. 3a and FIG. 3b, schematically illustrates the message flows in an embodiment of the method according to the present invention. FIG. 4 schematically illustrates the elements of an embodiment of the secure processor according to the present invention.

The secure zone manager 420 is loaded by the secure ASIC's primary boot system. This boot system consists of a manufacturer provided primary boot system 410 and an ASIC private key 418. The primary boot may load a secondary boot through which the secure zone manager image 402 can be loaded, or it may directly load the secure zone manager 402; both scenarios are exemplified by the abstract messages 301 and 302 in FIG. 3. Although different owners may want to use different, custom-made secure zone managers, the images are preferably produced by the manufacturer. This places the burden of trustworthiness on the manufacturer.

When the secure zone manager 420 starts, it establishes a secure communication channel to the owner, schematically represented in FIG. 3 as message flow 303 and in FIG. 4 as interface 440. This mutually authenticated channel 440 represents the trust relationship between the owner (not shown) and secure zone manager 420. The primary use of this channel 440 is to establish a secure communication path for the management of secure virtual machines 430. Additionally, the secure zone manager 420 may transmit usage reports to the owner (not shown).

Once both the user/owner 304 and owner/secure zone manager 303/440 channels have been established, the communication channels are used by the user to request 305 the establishment of a new secure virtual machine 430 through a secure zone manager 420. The user addresses the owner, and the owner dispatches 306 the secure virtual machine request to one of its vTCBs 400. The user can verify it communicates with an appropriate vTCB by authenticating the secure zone manager itself, relying on the secure zone manager's certificate 404. Additionally, the user may receive 308 a certificate for the newly created secure virtual machine 430, signed by the secure zone manager 420.

After a secure virtual machine 430 is created for a user, it needs to securely boot the user's application. The secure zone manager 420 thus provides the infrastructure to enable the user to securely boot its secure virtual machine 430 with its application. Note that the owner is not part of this procedure and thus has no way to interfere; the end-to-end securing of the user-zone manager channel 450 effectively prevents any potential man-in-the-middle attacks.

The new secure virtual machine 430 then loads 311 the user selected program and boots the application in a secure manner. As it receives a private key 432, it can set up 312 a secure communication channel 470 directly with the user.

An embodiment of a secure and virtualizable processing environment according to the present invention is based on the single-machine secure processor ARM1176+Trustzone. This embodiment provides support for multiple of such secure processing machines. The embodiment is schematically illustrated in FIG. 4.

First, to support multiple secure virtual machines in the Trustzone architecture, an n-bit wide bus is provided instead of a single secure address modifier bit. Each secure virtual machine is keyed to a particular binary representation on this address modifier bus, hereinafter referred to as Secure Address Modifier Bus (SAMB). Peripherals inside the secure ASIC take the state of the SAMB into consideration when enabling or disabling access to their device.

A two-dimensional matrix representing the capabilities of a secure virtual machine on the peripherals inside the secure ASIC is associated with the SAMB on the internal ASIC's bus. An exemplary representation of such a matrix, addressing four peripherals and four virtual machines, is shown in FIG. 5. Each peripheral in the secure ASIC is represented by a column and each of the secure virtual machines is given a row. To enable read and/or write access to a peripheral for a particular secure virtual machine, the associated bits in the matrix are set.

Two special rows may be defined in the capability matrix: the unsecured machine and the super secure virtual machine. Both these zones are identical to their equivalent states in the standard Trustzone architecture: a machine without any secure peripheral access and a machine with secure peripheral access, respectively. The unsecured machine is typically located at row zero, represented its binary representation on the secure zone address modifier bus. In one preferred embodiment, the super secure virtual machine uses modifier 01*1 on the SAMB. Typically, only a single super secure virtual machine should have write access to the secure capability matrix.

The unsecured processing machine is meant for executing tasks that do not require, and will not get, any specific security.

The super secure virtual machine is meant for managing other secure virtual machines. Through the super secure virtual machine, new rows can be initialized, and new applications can be installed in newly formed ordinary secure zones. The super secure virtual machine can also stop and remove ordinary secure virtual machines.

To ensure that no information leaks between the various secured and unsecured secure virtual machines, each secure virtual machine may be associated with a separate memory encryption key. A memory controller stores this memory key internally in the memory controller device, or in ordinary memory protected with its own key. Based on the secure modifier on the SAMB, the memory controller selects a key with which it can cipher data that is sent to or retrieved from main external memory.

The secure zone manager is a para-virtualizing virtual machine manager, which does not rely on binary translation of the executed guest operating systems. This ensures that users are able to calculate a MD5 checksum over the executing image to verify that the images have not been altered with. Moreover, the secure zone manager provides all mechanisms to virtualize the processor and the machine's resources to all guest operating systems executing on the processor.

As is shown in FIG. 2, the entities in the call flow are the owner (the proprietor of the equipment), the secure zone manager, the secure virtual machine and the user (i.e., renter). Additionally, we need to recognize the role of the manufacturer.

The owner, manufacturer and user have a private and public key and the public keys are part of signed certificates. The respective private keys will be designated $K_{own}^{-1}$, $K_{mfr}^{-1}$ and $K_{user}^{-1}$. The respective public keys will be designated $K_{own}$, $K_{mfr}$, and $K_{user}$.

Certificates associating public keys with the owner, manufacturer, and user, respectively, are signed by each respective authority designated A(.), which may be part of a Public Key Infrastructure (PKI): $C(own, K_{own}, A(own))_{K_{A(own)}^{-1}}$, $C(mfr, K_{mfr}, A(mfr))_{K_{A(mfr)}^{-1}}$, and $C(user, K_{user}, A(user))_{K_{A(user)}^{-1}}$. The user's certificate preferably includes the user's address, enabling the zone manager and/or a secure virtual machine instantiation to contact the user using a trusted address.

We assume the ASIC to be equipped with its own private key 418, $K_{asic}^{-1}$, encoded for example in a fuse array or in on-ASIC non-volatile RAM, with which a public key $K_{asic}$ is associated.

Associated with the ASIC's private key 418 is a certificate that is signed by the manufacturer. We assume that the ASIC has a private boot area 410 for the initial boot program. The secure hash of this boot program is embedded in the certificate of the ASIC: $C(ASIC, K_{asic}+hash, mfr)_{K_{mfr}^{-1}}$. The manufacturer may make the secure hashes of the trusted boot programs available in additional ways.

Upon booting the embedded boot program, the ASIC is adapted to receive a zone manager image 402, typically from the owner, via an ASIC-owner channel 460. This zone manager image 402 may be produced by the manufacturer, in whole or in part to the specifications of the owner. The ASIC is adapted to calculate 412 a secure hash H over the zone manager image, by means of a hashing algorithm such as MD5, and compare this to a hash $h(ZM)_{K_{mfr}^{-1}}$, provided and certified by the manufacturer. The zone manager image 420 is only booted if the verification succeeds.

The secondary image 402 includes the owner's certificate $C(own, K_{own}, A(own))_{K_{A(own)}^{-1}}$.

When started, the zone manager 420 creates 414 a public/private key pair ($K_{ZM}$, $K_{ZM}^{-1}$) the session, a session being defined as the time between the start of the zone manager and the time the processor is reset and rebooted, implying the termination of the zone manager. The public key is certified 416 with the ASIC's key 418, and the certificate 404, $C(ZM, K_{ZM}, ASIC)_{K_{ASIC}^{-1}}$, is made available to the owner. The private key 426 in turn allows the zone manager 420 to sign certificates 424 for the instances 430 it creates.

A user can obtain a secure virtual machine 430 by requesting this from an owner. For this, the user first establishes a secure, mutually authenticated channel between the owner and the user (not shown), relying on certificates obtained for example through a PKI. Once established, the user transmits a "create secure virtual machine" message to the owner. The owner selects an appropriate (e.g. lightly loaded) secure processor's zone manager 420 and forwards the request to the zone manager 420.

The owner's "create secure virtual machine" message may be accompanied by the user's certificate C(user, . . . ). This certificate is first used to establish a secure communication channel 450 between the secure zone manager 420 and user and later the certificate is used by the newly created secure virtual machine 430 to establish a secure channel 470 to the user. The secure channel 450 between the zone manager and the user is used to assert to the user it can trust the zone manager.

On receipt of the "create secure virtual machine" message, the zone manager 420 first creates 422 a public/private key pair ($K_{SVM}$, $K_{SVM}^{-1}$) for the new zone, and certifies 424 the public key. The zone manager then transmits the certificate $C(SVM, K_{SVM}, ZM)_{K_{ZM}^{-1}}$ to the user over the communication channel 450 established earlier.

Finally, the zone manager 420 prepares the new secure virtual machine 430. It allocates entries in the earlier mentioned security capability matrix, primes the memory controller with an appropriate session key, and loads a boot program into the new secure virtual machine 430. The user's certificate $C(user, K_{user}, A(user))_{K_{A(user)}^{-1}}$ is passed as a parameter to the secure virtual machine's boot loader. This boot loader is pre-installed (and thus trusted) by the zone manager 420.

The virtual machine 430 is readied for execution through the zone manager 420 and the zone manager 420 eventually starts the new secure virtual machine 430.

When the new secure virtual machine 430 starts, it operates in a secure environment such that only the zone manager 420 potentially can disrupt operations. Since our assumption is that the manufacturer can be trusted, so can the zone manager 420. Note that the initial load of the new secure virtual machine 430 is a secure boot loader, primed with the user's network address.

The first thing the secure virtual machine 430 does is to establish a secure communication channel 470 between the new zone and the user. The new zone uses $C(user, K_{user}, A(user))_{K_{A(user)}^{-1}}$, including the network address recorded in the certificate, to establish the session, while the user uses $C(SVM, K_{SVM}, ZM)_{K_{ZM}^{-1}}$ to establish the session. $C(SVM, K_{SVM}, ZM)_{K_{ZM}^{-1}}$ was returned by the owner to the user during the "create secure virtual machine" message.

Once the secure communication channel 470 has been established between the user and the newly created secure virtual machine 430, the user can upload their application into the new secure virtual machine 430 and start that application. The boot loader passes the user's certificate $C(user, K_{user}, A(user))_{K_{A(user)}^{-1}}$ through to the newly loaded application to enable the application to re-establish the secure communication channel between the secure virtual machine now executing the user's application and the user. The secure virtual machine 430 now starts the operation mode.

In an embodiment of the present invention, the operational zone manager 420 and the owner periodically exchange usage reports 313 for the secure virtual machine 430. These reports can be used by the owner for instance, to prepare billing records for the user's use of the hardware. Additionally, the user can send management requests 314 to the zone manager 420 via the secure communication channels (450, 470). These requests may concern operations that increase or decrease the number of cycles spent on the secure virtual machine 430, or completely suspend and resume the secure virtual machine 430. One such request 316 may concern stopping the secure virtual machine 430 altogether and clean up all state information associated with the secure virtual machine 430 to be terminated. An effective way to achieve this result is to clear the session key used for the zone's secure memory slice.

In an embodiment of the present invention, the secure virtual machine 430 accesses a shared memory 490 through a memory controller 480, using the memory encryption key assigned to that particular secure virtual machine 430 to ensure the privacy of that secure virtual machine's data.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor (s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS, are conceptual only. Their function may be carried out through the operation of program logic, through dedicated logic, through the interaction of program control and dedicated logic, or even manually, the particular technique being selectable by the implementer as more specifically understood from the context.

The invention claimed is:

1. A method for hosting a secure virtual machine, instantiated by a user, on a computer processor provided by an owner, comprising the steps of:
    booting said computer processor with a zone manager image to start a zone manager session in accordance with a computer processor private key;
    procuring at said computer processor a first public/private key pair ($K_{ZM}$, $K_{ZM}^{-1}$) associated with the zone manager session;
    generating a certificate (C(ZM)) for the public key ($K_{ZM}$) of said first public/private key pair using said private key associated with said computer processor;
    receiving, at said computer processor running the zone manager, a secure virtual machine instantiation command from said owner as requested by said user, said secure virtual machine instantiation command including a certificate of said user (C(user));
    creating between said zone manager and said user a secure communication channel;
    creating, at said computer processor running the zone manager, a second public/private key pair ($K_{SVM}$, $K_{SVM}^{-1}$) associated with the secure virtual machine;
    generating a certificate (C(SVM)) for the public key of said second public/private key pair with the private key of said first public/private key pair; and
    creating, between said secure virtual machine and said user a second secure communication channel certified by C(user) and C(SVM).

2. The method according to claim 1, further comprising the step of:
    booting the computer processor from a program stored in a private boot area.

3. The method according to claim 1, further comprising the step of:
    downloading said zone manager image to said computer processor, and verifying at said computer processor a validation value pertaining to said zone manager image, as a precondition for said booting of said computer processor with said zone manager image.

4. The method according to claim 1, further comprising the step of:
    associating with said secure virtual machine a cryptographic key for accessing particular content stored in a shared memory of said computer processor.

5. The method according to claim 1, wherein a security aspect of said secure communication channel relies on said certificate pertaining to said user.

6. The method according to claim 5, further comprising the step of:
    providing said certificate pertaining to said user to said zone manager.

7. The method according to claim 5, wherein said secure communication channel is secured by means of public key cryptography.

8. The method according to claim 1, further comprising the step of:
    updating a capability matrix with access permissions for said virtual machine.

9. The method according to claim 1, further comprising the steps of:
    preparing said secure virtual machine by providing it with a boot program; and
    starting said secure virtual machine.

10. A non-transitory computer-readable medium storing computer-readable instructions that, when executed on a computer processor for hosting a secure virtual machine, instantiated by a user, on the computer processor, comprise the steps of:
    booting said computer processor with a zone manager image to start a zone manager session in accordance with a computer processor private key;
    procuring at said computer processor a first public/private key pair ($K_{ZM}$, $K_{ZM}^{-1}$) associated with the zone manager session;
    generating a certificate (C(ZM)) for the public key ($K_{ZM}$) of said first public/private key pair using said private key associated with said computer processor;
    receiving, at said computer processor running the zone manager, a secure virtual machine instantiation command from said owner as initiated by said user, said secure virtual machine instantiation command including a certificate of said user (C(user));

creating between said zone manager and said user a secure communication channel;

creating, at said computer processor running the zone manager, a second public/private key pair ($K_{SVM}$, $K_{SVM}^{-1}$) associated with the secure virtual machine; and generating a certificate (C(SVM)) for the public key of said second public/private key pair with the private key of said first public/private key pair; and creating, between said secure virtual machine and said user a second secure communication channel certified by C(user) and C(SVM).

11. The non-transitory computer-readable medium according to claim 10, storing computer-readable instructions that further comprise the step of:

booting the computer processor from a program stored in a private boot area.

12. The non-transitory computer-readable medium according to claim 10, storing computer-readable instructions that further comprise the step of:

downloading said zone manager image to said computer processor, and verifying at said computer processor a validation value pertaining to said zone manager image, as a precondition for said booting of said computer processor with said zone manager image.

13. The non-transitory computer-readable medium according to claim 10, storing computer-readable instructions that further comprise the step of:

associating with said secure virtual machine a cryptographic key for accessing particular content stored in a shared memory of said computer processor.

14. The non-transitory computer-readable medium according to claim 10, wherein a security aspect of said secure communication channel relies on said certificate pertaining to said user.

15. The non-transitory computer-readable medium according to claim 14, storing computer-readable instructions that further comprise the step of:

providing said certificate pertaining to said user to said zone manager.

16. The non-transitory computer-readable medium according to claim 14, wherein said secure communication channel is secured by means of public key cryptography.

17. The non-transitory computer-readable medium according to claim 10, storing computer-readable instructions that further comprise the step of:

updating a capability matrix with access permissions for said virtual machine.

18. The non-transitory computer-readable medium according to claim 10, storing computer-readable instructions that further comprise the step of:

preparing said secure virtual machine by providing it with a boot program; and starting said secure virtual machine.

\* \* \* \* \*